United States Patent [19]

Turin

[11] Patent Number: 5,963,906
[45] Date of Patent: *Oct. 5, 1999

[54] SPEECH RECOGNITION TRAINING

[75] Inventor: William Turin, East Brunswick, N.J.

[73] Assignee: AT & T Corp, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/859,360

[22] Filed: May 20, 1997

[51] Int. Cl.$^6$ ................................ G10L 5/06; G10L 9/00
[52] U.S. Cl. ...................... 704/256; 704/232; 704/236; 704/243
[58] Field of Search .................................. 704/256, 232, 704/236, 243

[56] References Cited

U.S. PATENT DOCUMENTS 5,381,513  1/1995  Tsuboka .................................. 704/232

OTHER PUBLICATIONS

Deller et al, Discrete–time processing of speech signals, pp. 679–735, Prentice–Hall, New Jersey, Jun. 1987.

Zhang and Mason, Improved training using semi–hidden . . . , Proc. IEEE ICASSP, vol. 1 pp. 306–309, Jun. 1989.

Sivaprakasam, An equivalent Markov . . . IEEE Transactions on Comm. vol. 43 No. 2–4, pp. 1347–1355. Apr. 1995.

Deng et al, A locus model of Coarticulation in an HMM . . . Proc. IEEE ICASSP, vol. 1 pp. 97–100, Jun. 1989.

*Primary Examiner*—David R. Hudspeth
*Assistant Examiner*—Robert Louis Sax

[57] ABSTRACT

A method and system performs speech recognition training using Hidden Markov Models. Initially, preprocessed speech signals that include a plurality of observations are stored by the system. Initial Hidden Markov Model (HMM) parameters are then assigned. Summations are then calculated using modified equations derived substantially from the following equations, wherein $u \leq v < w$:

$$P(X_u^{\,w}) = P(x_u^{\,v}) P(x_{v+1}^{\,w})$$

and $$\Omega_{ij}(x_u^{\,w}) = \Omega_{ij}(x_u^{\,v}) P(x_{v+1}^{\,w}) + P(x_u^{\,v}) \Omega_{ij}(x_{v+1}^{\,w})$$

The calculated summations are then used to perform HMM parameter reestimation. It then determines whether the HMM parameters have converged. If they have, the HMM parameters are then stored. However, if the HMM parameters have not converged, the system again calculates summations, performs HMM parameter reestimation using the summations, and determines whether the parameters have converged. This process is repeated iteratively until the HMM parameters have converged.

8 Claims, 5 Drawing Sheets

SPEECH RECOGNITION TRAINING

BACKGROUND OF THE INVENTION

The present invention is directed to speech recognition training. More particularly, the present invention is directed to speech recognition training using Hidden Markov Models.

A popular approach to performing speech recognition is to use Hidden Markov Models (HMMs). An HMM is a probabilistic function of a Markov chain and can be defined as $\{S,X,\Pi,A,B\}$, where $S=\{s_1, s_2, \ldots, s_n\}$ are the Markov chain states, X denotes the HMM output (observation) set, $\Pi$ is a vector of state initial probabilities, $A=[a_{ij}]_{n,n}$ is a matrix of state transition probabilities ($a_{ij}=Pr\{s_j|s_i\}$), and $B(x)=\text{diag}\{b_j(x)\}$ is a diagonal matrix of the output $x \in X$ conditional probability densities in state $s_j$. If X is discrete, $B(x)$ is a matrix of probabilities ($b_j(x)=Pr\{x|s_j\}$). Without loss of generality, states are denoted by their indices ($s_{i=i}$).

In order for a device to perform speech recognition, that device must first fit HMMs to experimental data which entails generating model parameters. This process is referred to as "training" the speech recognition device.

There are a number of well-known ways for building a Hidden Markov Model for speech recognition. For example, as set forth in L. Rabiner et al, "Fundamentals of Speech Recognitionp", Chapter 6, Section 6.15, a simple isolated word recognition model can be created by assigning each word in a vocabulary a separatic model, and estimating the model parameters (A, B, $\pi$) that optimizes the likelihood of the training set observation vectors for that particular word. For each unknown word to be recognized, the system (a) carries out measurements to create an observation sequence X via feature analysis of the speech corresponding to the word; (b) calculates the likelihood for all possible word models; and (c) selects the word whose model likelihood is highest. Examples of the other speech recognition systems using Hidden Markov Models can be found in Rabiner et al. and in U.S. Pat. Nos. 4,587,670 to Levinson et al. (reissued as Re33,597) and 4,783,804 to Juang et al. which are incorporated by reference herein.

There are various known methods to perform training using HMMs by optimizing a certain criterion (e.g., a likelihood function, an a posteriori probability, an average discrimination measure, etc.). However, these known methods all have drawbacks. For example, known methods that use the Newton-Raphson algorithm or the Conjugate Gradient algorithm, both of which are disclosed in W. H. Press, et al., "Numerical Recipes in C", Cambridge University Press (1992), converge fast in a small vicinity of optimum, but are not robust. Therefore, if parameter values are not very close to optimum, they might no converge.

Further, a known method that uses the Baum-Welch algorithm in conjunction with the forward-backward algorithm (the "Baum-Welch" method) is disclosed in L. E. Baum et al., "A Maximization Technique Occurring in the Statistical Analysis of Probabilistic Functions of Markov Chains", Ann. Math. Statist, 41, pp. 164–171 (1970). Training using this method converges slowly and requires a large amount of memory. therefore, training using this method must be implemented on a powerful computer with a large amount of memory.

Various approaches are known that speed up the Baum-Welch method. For example, W. Turin, "Fitting Probabilistic Automata via the EM Algorithm", Commun. Statist.—Stochastic Models, 12, No. 3, (1996) pp, 405–424 discloses that the speed of the forward-backward algorithm can be increased if observation sequences have repeated patterns and, in particular, long stretches of repeated observations. S. Sivaprakasam et. al., "A Foward-Only Procedure for Estimating Hidden Markov Models", GLOBECOM (1995) discloses that in the case of discrete observations, a forward only algorithm can be used that is equivalent to the forward-backward algorithm. However, these known approaches require specialized situations (i.e., long stretches of repeated observations and discrete observations).

Based on the foregoing, there is a need for a speech recognition training method and apparatus for generalized situations that is robust and does not require a large amount of memory.

SUMMARY OF THE INVENTION

The present invention is a method and system for performing speech recognition training using Hidden Markov Models that satisfies the above needs and more. In one embodiment, the present invention first stores preprocessed speech signals that include a plurality of observations. Initial Hidden Markov Model (HMM) parameters are then assigned. Summations are then calculated using modified equations derived substantially from the following equations, wherein $u \leq v \leq w$:

$$P(x_u^v) = P(x_u^v)P(x_{v+1}^w)$$

and $$\Omega_{ij}(x_u^w) = \Omega_{ij}(x_u^v)P(x_{v+1}^w) + P(x_u^v)\Omega_{ij}(x_{v+1}^w)$$

The calculated summations are then used to perform HMM parameter reestimation. The present invention then determines whether the HMM parameters have converged. If they have, the HMM parameters are then stored. However, if the HMM parameters have not converged, the present invention again calculates summations, performs HMM parameter reestimation using the summations, and determines whether the parameters have converged. This process is repeated iteratively until the HMM parameters have converged.

DETAILED DESCRIPTION

The present invention is a method and apparatus for performing speech algorithm training. The present invention implements unique algorithms in order to generate HMM parameters and summations that are used in conjunction with the Baum-Welch algorithm. The use of the algorithms enables the speech recognition training of the present invention be more robust than the prior art and require less memory.

Figure 1:
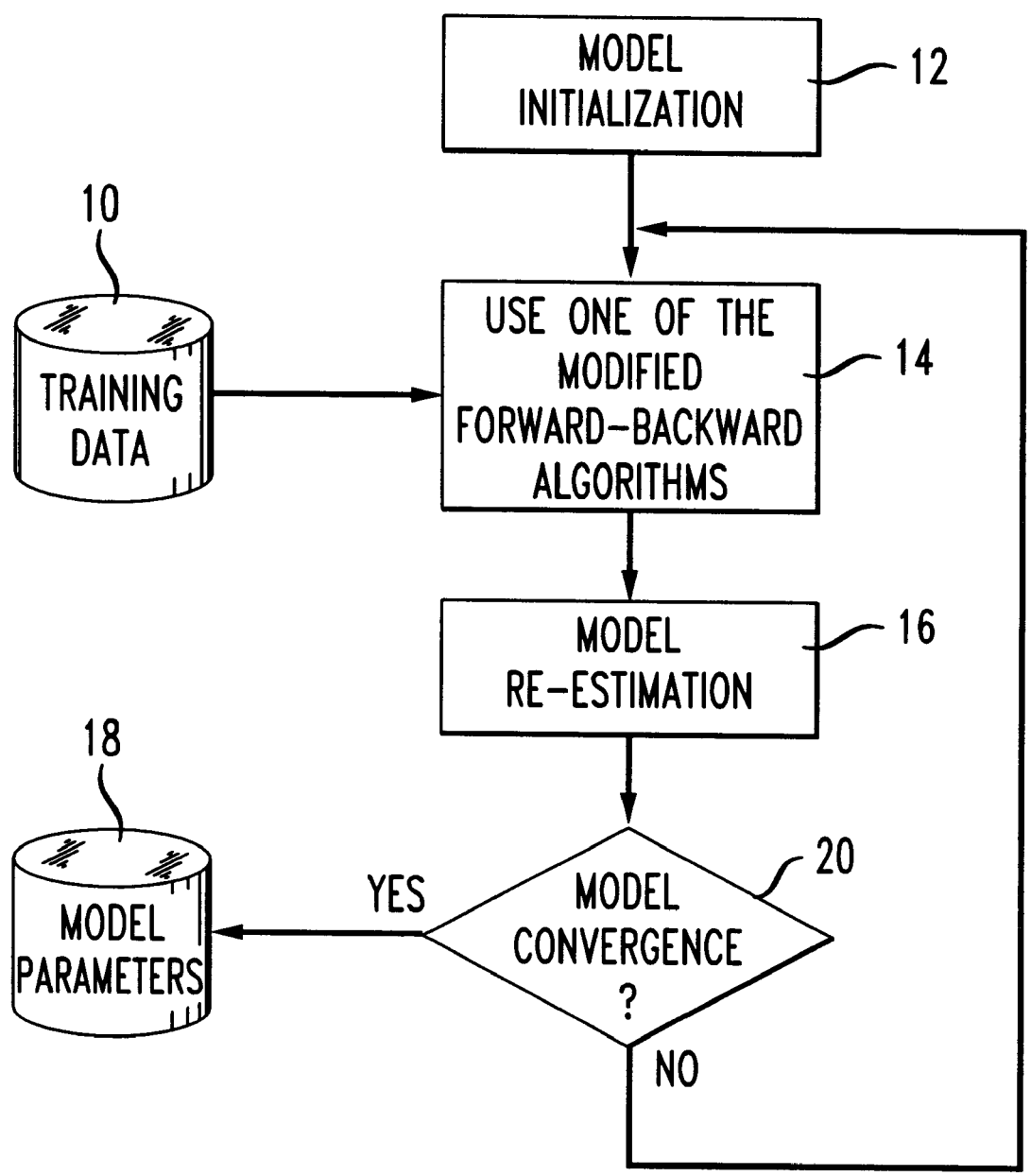
FIG. 1 is flow diagram of a speech algorithm training apparatus in accordance with the present invention.

FIG. 1 is flow diagram of a speech algorithm training apparatus in accordance with the present invention. Because the present invention does not require a large amount of memory, it can be implemented on a relatively small computer compared to prior art speech algorithm training methods. In one embodiment, the present invention is implemented on a general purpose computer that includes a processor and a storage device. In another embodiment, the present invention is implemented on a computer with parallel processors.

Storage device 10 in FIG. 1 stores preprocessed speech samples, or training data, in the form of feature vectors. Preprocessing speech samples and converting them to vectors is well known and is disclosed in, for example, L. Rabiner et al., "Fundamentals of Speech Recognition", Prentice Hall, Englewood Cliffs, N.J. (1993).

For example, a sequence of measurements can be made on a speech input signal to define a test pattern. For speech signals, the feature measurements are usually the output of some type of spectral analysis technique, such as a filter bank analyzer, a linear predictive coding ("LPC") analysis, conversion to cepstral coefficients (or delta cepstral coefficients or delta energy, etc.), or a discrete Fourier transform ("DFT") analysis. Such acoustic feature analysis is well known in the art. For example, the two dominant methods of spectral analysis—namely filter-bank spectrum analysis and LPC analysis—are discussed at length in Chapter 3 of Rabiner et al. The output of the acoustic feature analysis is a time sequence of spectral feature vectors, or, as it is often referred to, a speech pattern.

At step 12, HMM initialization is performed in a known manner by assigning initial HMM parameters. One known method for performing HMM initialization uses the segmental K-means algorithm which is disclosed in L. Rabiner et al., "Fundamentals of Speech Recognition", Prentice Hall, Englewood Cliffs, N.J. (1993). The initial parameters are provided to step 14, described below, when the speech algorithm training apparatus is initialized.

At step 14 one of the modified forward-backward algorithms that will be described in detail below performs calculations based on training data stored in storage unit 10 and old HMM parameters. The old HMM parameters are input from either step 12 when the speech algorithm training apparatus is initialized, or from step 20, described below. The calculations are used in step 16 described below.

At step 16, model reestimation is performed using the Baum-Welch equations to improve the parameters received from step 14. Model reestimation using the Baum-Welch algorithm is an iterative procedure for maximum likelihood estimation of the parameters. The Baum-Welch algorithm finds the maximum iteratively. The Baum-Welch algorithm is well known and is disclosed in, for example, L. E. Baum et al., "A Maximization Technique Occurring in the Statistical Analysis of Probabilistic Functions of Markov Chains", Ann. Math. Statist, 41, pp. 164–171 (1970), herein incorporated by reference.

When performing model reestimation in step 16 using the following Baum-Welch equations are used:

$$\pi_{i,p+1} = \pi_{i,p}\beta_i(x_1^T)/p(x_1^T;\theta_p) \quad (1a)$$

$$a_{ij,p+1} = U_{ij}(x_1^T) \bigg/ \sum_{j=1}^{n} U_{ij}(x_1^T), \quad (1b)$$

$$\psi_{j,p+1} = \text{argmax} \sum_{t=1}^{T} \log b_j(x_t;\psi_j) V_j(t, x_1^T, \theta_p) \quad (1c)$$

where $p = 0, 1, \ldots,$ and $$U_{ij}(x_1^T) = \sum_{t=1}^{T} B_{ij}(t, x_1^t, \theta_p), \quad (1d)$$

is the estimated mean number of transitions from state i to state j and observing a sequence $x_1^T = (x_1, x_2, \ldots, x_T)$, $$V_j(t, x_1^T, \theta_p) = \sum_{i=1}^{n} B_{ij}(t, x_1^T, \theta_p) = \alpha_j(x_1^T)\beta_j(x_{t+1}^T) \quad (1e)$$

is the probability of being in state j at the moment t and observing $x_1^T$, $$B_{ij}(t,x_1^T, \theta_p) = \alpha_i(x_1^{t-1})a_{ij,p}b_j(x_t;\Psi_{j,p})\beta_j(x_{t+1}^T) \quad (1f)$$

is the probability of transferring from state i to state j at the moment t and observing $x_1^T$. Equations (1a)—(1f) are similar to the equations for estimating parameters of Markov chains disclosed in P. Billingsley, "Statistical Methods in Markov Chains," Ann. Math. Statist, vol. 32, pp. 12–40 (1961). The only difference is that actually observed transitions are replaced by the estimated mean number of transitions.

Equations (1a) and (1b) are used to fit a hidden Markov chain, while equation (1c) is used to fit state observation probability densities.

Step 14 in FIG. 1 provides the summation calculations that are needed in equations (1b), (1c), (1d) and (1e). The method of performing step 14 in accordance with the present invention requires less computing power and storage space than the prior art method of calculating the summations.

At step 20, model convergence is checked by using one of the well known criteria disclosed in, for example, W. H. Press, et al., "Numerical Recipes in C", Cambridge University Press (1992). One criteria is to determine how much the new model parameters from step 16 differ from the old ones. If the difference is greater than a predetermined value, step 14 is performed again. If the difference is less than the predetermined value, the model parameters are stored in storage unit 18. The HMM model parameters can then be used by a speech recognition device in a known way.

Probabilities of various events can be evaluated using the notion of matrix probability. It is convenient to introduce an observation x matrix probability density as $$P(x) = AB(x) \qquad (2)$$

Using this notation the probability density of $x_1^T$ can be expressed as $$p(x_1^T) = \pi P(x_1) P(x_2) \ldots P(x_T) 1 = \pi \prod_{t=1}^{T} P(x_t) 1 \qquad (3)$$

where 1 is a column vector of ones. If observations are discrete this formula represents the sequence probability. The matrix probability density (or probability in the discrete case) of the sequence is defined as $$P(x_1^T) = \prod_{t=1}^{T} P(x_t). \qquad (4)$$

Then equation (3) can be written as $$P(x_t^T) = \pi P(x_t^T) 1$$

Therefore, probability density of any event in the σ-field generated by the observation sequences can be computed similarly using the matrix probability of the event.

Let $1 < t_1 < t_2 < \ldots < t_k < T$ be a partition of the interval $[1,T]$, then matrix probabilities defined by equation (4) can be written as:

$$P(x_1^T) = P(x_1^{t_1}) P(x_{t_1+1}^{t_2}) \ldots P(x_{t_k+1}^T) \qquad (5)$$

Each matrix probability $P(x_u^v)$ in this equation can be evaluated independently (possibly on parallel processors) using matrix forward or backward algorithms:

$$P(x_u^{t+1}) = P(x_u^t) P(x_{t+1}), t=u, u+1, \ldots, v-1$$

$$P(x_t^v) = P(x_t) P(x_{t+1}^v) t=v-1, v-2, \ldots, u$$

or, more generally, $$P(x_u^w) = P(x_u^v) P(x_{v+1}^w), \text{ for } u \leq v < w \qquad (6)$$

It is also convenient to assume that $P(x_u^v) = I$ is a unit matrix for $u > v$. Fast matrix exponentiation algorithm can be applied if $x_u = x_{u+1} = \ldots = x_v = x$.

Using these matrix probabilities we can write $$\alpha(x_t^t) = \pi P(x_1^t), \beta(x_t^T) = P(x_t^T) 1$$

and $$\alpha(x_t^v) = \alpha(x_t^u) P(x_{u+1}^v), \beta(x_u^T) = P(x_u^{v-1}) \beta(x_v^T)$$

The present invention performs the function of step 14 in FIG. 1 by utilizing a matrix form of the Baum-Welch algorithm. The matrix form is derived from the Expectation Maximization ("EM") algorithm, which is disclosed in, for example, W. Turin, "Fitting Probabilistic Automata via the EM Algorithm", Commun. Statist.—Stochastic Models, 12, No. 3, (1996) pp. 405–424, herein incorporated by reference.

The EM algorithm can be modified to be used for multiple observations. For example, suppose that there are several observation sequences $\{x_k\}_1^{T_k}$, $k=1,2,\ldots,k$. In this case the EM algorithm takes the form $$\pi_{i,p+1} = \frac{\pi_{i,p}}{K} \sum_{k=1}^{K} \beta_i(\{x_k\}_1^{T_k}) / p(\{x_k\}_1^{T_k}; \theta_p) \qquad (7a)$$

$$a_{ij,p+1} = \frac{\sum_{k=1}^{K} U_{ij}(\{x_k\}_1^{T_k}) / p(\{x_k\}_1^{T_k}; \theta_p)}{\sum_{k=1}^{K} \sum_{j=1}^{n} U_{ij}(\{x_k\}_1^{T_k}) / p(\{x_k\}_1^{T_k}; \theta_p)} \qquad (7b)$$

$$\psi_{j,p+1} = \text{argmax} \sum_{k=1}^{K} \sum_{t=1}^{T_k} \log b_j(x_t; \psi_j) V_j(t, \{x_k\}_1^{T_k}, \theta_p) / p(\{x_k\}_1^{T_k}; \theta_p). \qquad (7c)$$

Equation (7c) can be solved analytically for discrete and exponential family observation probability distributions.

It follows from equations (7a) (7b) and (7c) that the main difficulty in applying the Baum-Welch algorithm, which is a special case of the EM algorithm, is computing sums of the type $$S_{ijT} = \sum_{t=1}^{T} B_{ij}(t, x_1^T, \theta) \eta_t$$

where $\eta_t$ are some weights. In order to develop an efficient algorithms for computing these sums $\eta_t B_{ij}(t, x_1^T, \theta)$ can be presented in the following matrix form $$\eta_t B_{ij}(t, x_1^T, \theta) = \eta_t a_{ij} b_j(x_t; \Psi_j) \alpha_i(x_1^{t-1}) \beta_j(x_{t+1}^T) = \alpha(x_1^{t-1}) W_{ij}(x_t) \beta(x_{t+1}^T)$$

where $$W_{ij}(x_t) = \eta_t a_{ij} b_j(x_t; \Psi_j) e_i e_j$$

$e_i = (0,0, \ldots, 0,1,0, \ldots, 0)$ is a unit vector whose i-th coordinate is 1. Thus, efficient algorithms for computing the following sums need to be developed:

$$S_{ijT} = \sum_{t=1}^{T} B_{ij}(t, x_1^T, \theta) \eta_t = \sum_{t=1}^{T} \alpha(x_1^{t-1}) W_{ij}(x_t) \beta(x_{t+1}^T). \qquad (8)$$

Figure 2:
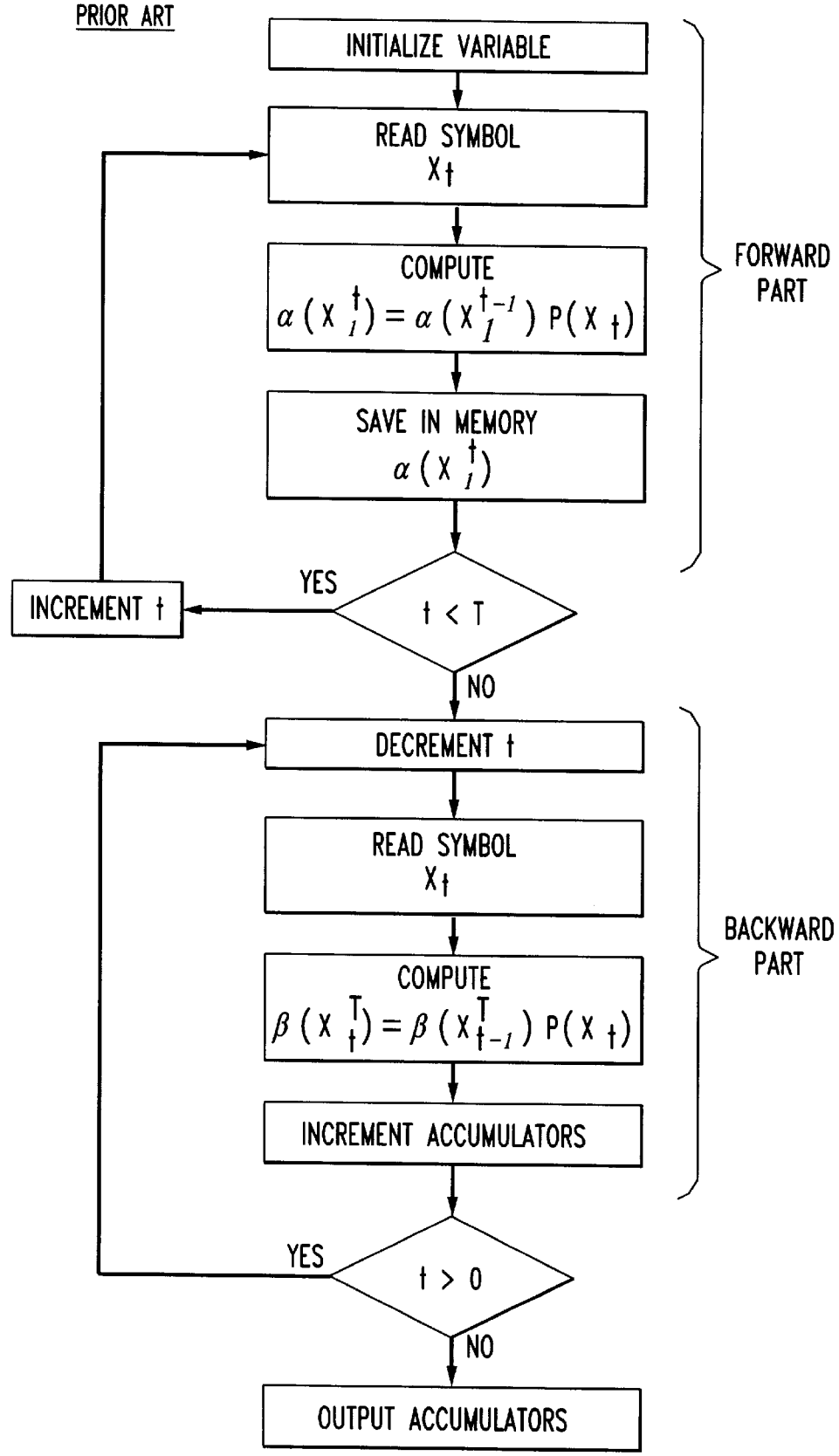
FIG. 2 is a flow chart of the steps performed by the prior art to perform summation equations.

The prior art for computing these sums is called the forward-backward algorithm, which is depicted in the flowchart set forth in FIG. 2. It consists of two parts; a forward part and a backward part. In the forward part, the forward vectors $\alpha(x_1^t)$ are initialized to $\alpha(x_1^0) = \pi$ in step 30 and are evaluted in step 34 according to the equation $$\alpha(x_1^{t+1}) = \alpha(x_1^t) P(x_{t+1}), t=0,1, \ldots, T-1$$

and saved in memory at step 36. In the backward part, the backward vectors are computed recursively in step 46 as $\beta(x_{T+1}^T) = 1$, and $$\beta(x_t^t) = P(x_t)\beta(x_{t+1}^T)$$

then $\beta_{ij}(t, x_t^T, \theta_p)$ are computed according to equation (1f) and $\eta_t\beta_{ij}(t,x_t^T, \theta_p)$ are added in step 48 to accumulators according to equation (1d). In step 52, the accumulated sums are sent to step 16 of FIG. 1 which performs the model parameter reestimation. Thus, the prior art requires storage for saving the forward vectors which is proportional to the observation sequence length T.

direct application of this equation, accordingly, usually requires an enormous amount of memory if T is large and $\alpha(x_t^{t-1})$ [or $\beta(x_{t+1}^T)$] are saved in the computer memory. Alternatively, if both $\alpha(x_t^{t-1})$ and $\beta(x_{t+1}^T)$ are calculated on-the-fly, it requires an enormous amount of the processing time.

In contrast, the present invention utilizes recursive algorithms to calculate the sum and, as is clear from the equations below, needs a storage size which is independent of the sequence length.

$$S_{ijT} = \pi \Omega_{ij}(x_1^T)1 \quad (9)$$

where $$\Omega_{ij}(x_1^T) = \sum_{t=1}^{T} P(x_1^{t-1})W_{ij}(x_t)P(x_{t+1}^T). \quad (10)$$

To calculate this matrix sum recursively, denote $$\Omega_{ij}(x_u^v) = \sum_{t=u}^{v} P(x_u^{t-1})W_{ij}(x_t)P(x_{t+1}^v). \quad (11)$$

It is easy to see that for any $u \leq v < w$ $$\Omega_{ij}(x_u^w) = \Omega_{ij}(x_u^v)P(x_{v+1}^w) + P(x_u^v)\Omega_{ij}(x_{v+1}^w) \quad (12)$$

Figure 3:
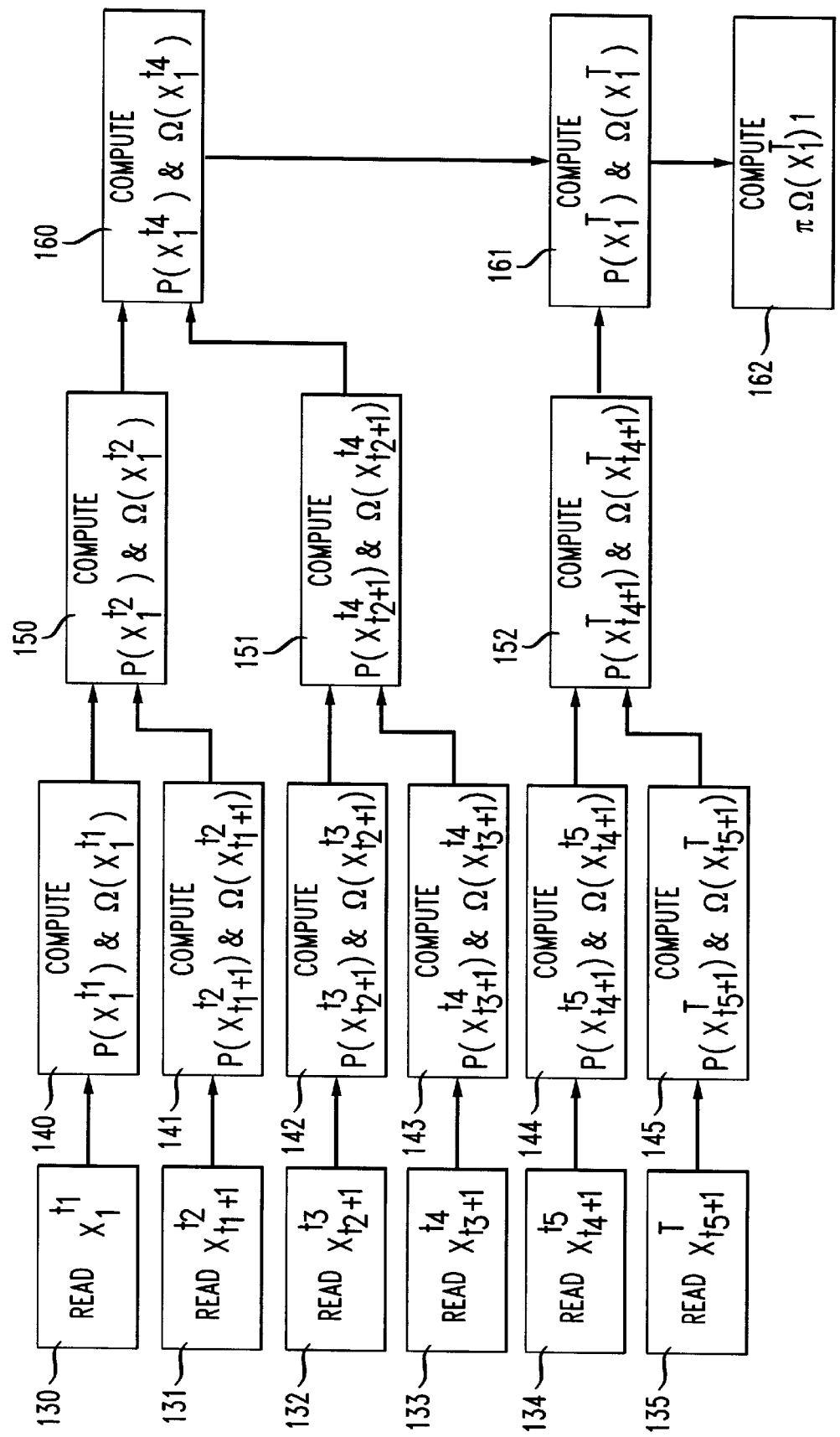
FIG. 3 is a flowchart of the steps performed by one embodiment of the present invention to calculate summations.

Equation (12) together with equation (6) form the basis for the modified foward-backward algorithms implemented by the present invention and illustrated by the flowchart in FIG. 3. Depending on the order of the matrix evaluation they can be treated as parallel, forward-only, or backward-only algorithms. It follows from equation (1e) that sums of the following form need to be calculated:

$$S_{jT} = \sum_{t=1}^{T} \eta_t V_j(t, x_1^T, \theta_p) = \sum_{i=1}^{N} S_{ijT}.$$

If it is not necessary to calculate $S_{ijT}$ for some other parameter, to save memory and speed-up the computation recursive algorithms for calculating $S_{jT}$ directly can be derived. These algorithms can be obtained from the corresponding algorithms for $S_{ijT}$ by summing both sides of the algorithm equations with respect to i. Thus, for example, equation (12) becomes:

$$\Omega_j(x_u^w) = \Omega_j(x_u^v)P(x_{v+1}^w) + P(x_u^v)\Omega_j(x_{v+1}^w)$$

where $$\Omega_j(x_u^w) = \sum_i \Omega_{ij}(x_u^w).$$

Parallel Algorithms

FIG. 3 is a flowchart of the steps performed by one embodiment of the present invention to perform step 14 of FIG. 1. First, the accumulators (i.e., locations in memory where the sums are accumulated) are initialized in a known manner. Initialization is typically achieved by clearing the memory.

In steps 130–135, the present invention reads training data from storage device 10 shown in FIG. 1. Training data can be read in parallel.

In steps 140–145, P's and $\Omega$'s are calculated for each training data read in steps 131–133 in parallel. Steps 140–145 are performed as follows:

Equation (12) allows calculations to be performed on parallel processors. To be more specific, denote $1 < t_1 < t_2 < \ldots < t_K < T$ a partition of the interval $[1, T]$, then it follows that:

$$P(x_1^{t_{k+1}}) = P(x_1^{t_k})P(x_{t_k+1}^{t_{k+1}}) \quad (13a)$$

$$\Omega_{ij}(x_1^{t_{k+1}}) = \Omega_{ij}(x_1^{t_k})P(x_{t_k+1}^{t_{k+1}}) + P(x_1^{t_k})\Omega_{ij}(x_{t_k+1}^{t_{k+1}}) \quad (13b)$$

These equations allow computations to be performed on parallel processors. Indeed, matrices $P(x_{t_k+1}^{t_{k+1}})$ and $\Omega_{ij}(x_{t_k+1}^{t_{k+1}})$ can be evaluated independently on parallel processors. Then equations (13) can be applied in the following way at steps 150 and 152 of FIG. 3:

Compute $\Omega_{ij}(x_1^{t_1})$ using any of the previously described algorithms. Then, using (13b) the following is obtained:

$$\Omega_{ij}(x_1^{t_2}) = \Omega_{ij}(x_1^{t_1})P(x_{t_1+1}^{t_2}) + P(x_1^{t_1})\Omega_{ij}(x_{t_1+1}^{t_2})$$

and equation (13a) gives $$P(x_1^{t_2}) = P(x_1^{t_1})P(x_{t_1+1}^{t_2})$$

Applying equations (13) again results in $$\Omega_{ij}(x_1^{t_3}) = \Omega_{ij}(x_1^{t_2})P(x_{t_2+1}^{t_3}) + P(x_1^{t_2})\Omega_{ij}(x_{t_2+1}^{t_3})$$

and $$P(x_1^{t_3}) = P(x_1^{t_2})P(x_{t_2+1}^{t_3})$$

and so on.

These equations are valid for any partition of the interval $[1, T]$. However, since matrices $P(x_{t_k+1}^{t_{k+1}})$ and $\Omega_{ij}(x_{t_k+1}^{t_{k+1}})$ are the same for the repeated observation patterns, the partition should take advantage of this property.

In the special case in which $t_k = t$ and $t_{k+1} = t+1$, $$\Omega_{ij}(x_t^t) = W_{ij}(x_t) \quad (14)$$

and equations (13) take the form $$P(x_1^{t+1}) = P(x_1^t)P(x_{t+1}) \text{ tm (15a)}$$

$$\Omega_{ij}(x_t^{t+1}) = \Omega_{ij}(x_1^t)P(x_{t+1}) + P(x_t^t)W_{ij}(x_{t+1}) \quad (15b)$$

Note that evaluation of $\Omega_{ij}(x_t^T)$ is performed in the forward-only fashion. Alternatively, the backward-only algorithm can also be applied starting with $\Omega_{ij}(x_{t_k}^T)$, $P(x_{t_k}^T)$ and recursively computing $$P(x_{t_k}^T) = P(x_{t_k}^{t_{k+1}-1})P(x_{t_{k+1}}^T) \quad (16a)$$

$$\Omega_{ij}(x_{t_k}^T) = P(x_{t_k}^{t_{k+1}-1})\Omega_{ij}(x_{t_{k+1}}^T) + \Omega_{ij}(x_{t_k}^{t_{k+1}-1})P(x_{t_{k+1}}^T) \quad (16b)$$

However, it is obvious that the actual direction of evaluation is not important. The present invention can compute part of the matrix products by forward-only algorithm and part of the products by backward-only algorithm. In the parallel implementation, the products can be evaluated at the moment when all the matrices in the right hand side of equations (13a) and (13b) are available. In this case the evaluation direction is defined by a tree in which the value $\Omega_{ij}(x_u^w)$ in the parent node is evaluated using the values $\Omega_{ij}(x_v^u)$ and $\Omega_{ij}(x_{v+1}^w)$ of its children according to equations (13a) and (13b); $\Omega_{ij}(x_1^T)$ is obtained at the root of the tree.

In the special case in which $t_k=t$ and $t_{k+1}=t+1$, equations (16) become $$P(x_t^T) = P(x_t)P(x_{t+1}^T)$$

$$\Omega_{ij}(x_t^T) = P(x_t)\Omega_{ij}(x_{t+1}^T) + W_{ij}(x_t)P(x_{t+1}^T)$$

Forward-Only Algorithms

Figure 4:
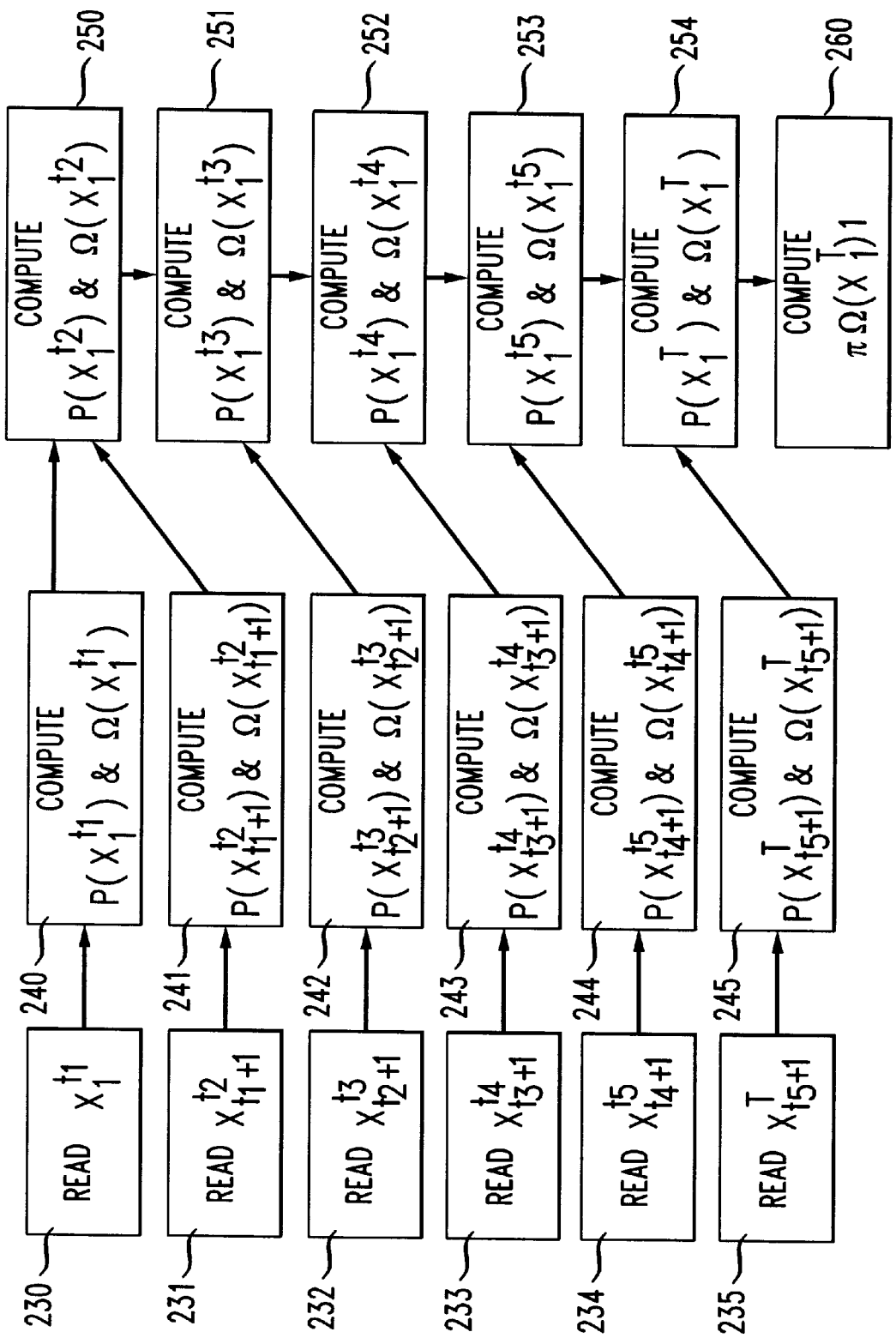
FIG. 4 is a flowchart of the steps performed by another embodiment of the present invention to calculate summations.

FIG. 4 is a flowchart of the steps performed by another embodiment of the present invention to perform step 14 of FIG. 1. First, the accumulators (i.e., locations in memory where the sums are accumulated) are initialized in a known manner. Initialization is typically achieved by clearing the memory.

In steps 230–235, the present invention reads training data from storage device 10 shown in FIG. 1. Training data can be read sequentially, or in parallel to speed up processing.

In steps 240–245, P's and $\Omega$'s are calculated for training data read in steps 230–235 sequentially or in parallel. In steps 250–254, $\alpha$'s and $\omega$'s are calculated using input from steps 240–245 in a forward-only manner.

To speed up calculations and reduce computer memory requirements, matrix equations can be converted into vector equations by multiplying equations (13) from the left by $\Pi$:

$$\alpha(x_1^{t_{k+1}}) = \alpha(x_1^{t_k})P(x_{t_k+1}^{t_{k+1}}) \quad (17a)$$

$$\omega_{ij}(x_1^{t_{k+1}}) = \omega_{ij}(x_1^{t_k})P(x_{t_k+1}^{t_{k+1}}) + \alpha(x_1^{t_k})\Omega_{ij}(x_{t_k+1}^{t_{k+1}}) \quad (17b)$$

where $$\omega_{ij}(x_1^{t_k}) = \Pi\Omega_{ij}(x_1^{t_k})$$

$\Omega_{ij}(x_{t_k+1}^{t_{k+1}})$ can still be evaluated on parallel processors as in FIG. 3, but $\omega_{ij}(x_1^{t_{k+1}})$ are evaluated sequentially. Thus, equations (17) represent a forward-only algorithm.

If $t_k=t$ and $t_{k+1}=t+1$, equations (17) become $$\alpha(x_1^{t+1}) = \alpha(x_1^t)P(x_{t+1}) \quad (18a)$$

$$\omega_{ij}(x_1^{t+1}) = \omega_{ij}(x_1^t)P(x_{t+1}) + \alpha(x_1^t)W_{ij}(x_{t+1}) \quad (18b)$$

This specialized version of the forward-only is disclosed in, for example, N. Tan, "Adaptive Channel/Code Matching," Ph.D. dissertation, University of Southern California (Nov. 1993).

The sum in equation (9) is found as $$S_{iji} = \omega_{ij}(x_1^T)1$$

We still need to calculate $P(x_1^t)$ [using forward-only equation (15a)] for reestimating $\Pi$ according to equation (1a). If we assume that the initial probability vector is fixed, there is no need to use equation (1a) and calculate $P(x_1^T)$.

Since all products of probabilities tend to zero, to increase the calculation accuracy and avoid underflow, it is necessary to scale the equations as disclosed in L. Rabiner et al., "Fundamentals of Speech Recognition", Prentice Hall, Englewood Cliffs, N.J. (1993). Multiplying right-hand sides of equations (18) by the common scale factor $c_t$ we obtain $$\overline{\alpha}(x_1^{t+1}) = c_t\overline{\alpha}(x_1^t)P(x_{t+1})$$

$$\overline{\omega}_{ij}(t+1,x) = c_t\overline{\omega}_{ij}(t,x)P(x_{t+1}) + c_t\overline{\alpha}(x_1^t)W_{ij}(x_{t+1})$$

$$\overline{P}(x_1^{t+1}) = c_t\overline{P}(x_1^t)P(x_{t+1})$$

In principle, $c_t$ can be any sequence since in reestimation equations (1a), (1b), (1c), and (1e) numerators and denominators are multiplied by the same factor $\Pi_i c_t$. However, it is recommended in L. Rabiner et al., "Fundamentals of Speech Recognition", Prentice Hall, Englewood Cliffs, N.J. (1993) to normalize $\alpha(x_1^{t+1})$. Thus, $$c_t = 1/\alpha(x_1^{t+1})1 = 1/\overline{\alpha}(x_1^t)P(x_{t+1})1$$

and we have the following relations between normalized and non-normalized values $$\overline{\alpha}(x_1^t) = \alpha(x_1^t)/\alpha(x_1^t)1 = \alpha(x_1^t)/\Pi P(x_1^t)1$$

$$\overline{P}(x_1^t) = P(x_1^t)/\Pi P(x_1^t)1$$

Advantageously, for the selected scale factors, the observation log-likelihood can be evaluated as $$\log Pr(x_1^T) = -\sum_{t=1}^{T}\log c_t$$

and equation (1a) is also simplified:

$$\Pi_{i,p+1} = \Pi_{i,p}\overline{\beta}_i(x_1^T), \overline{\beta}(x_1^T) = \overline{P}(x_1^T)1$$

In some applications, we assume that the process is stationary in which case the initial state probability distribution satisfies the following equations $$\Pi = \Pi A, \Pi 1 = 1$$

The stationary distribution can be estimated as a by-product of the Baum-Welch algorithm as disclosed in W. Turin et al., "Modeling Error Sources in Digital Channels", IEEE Jour. Sel. Areas in Commun., 11, No. 3, pp. 340–347 (1993).

Backward-Only Algorithm

Figure 5:
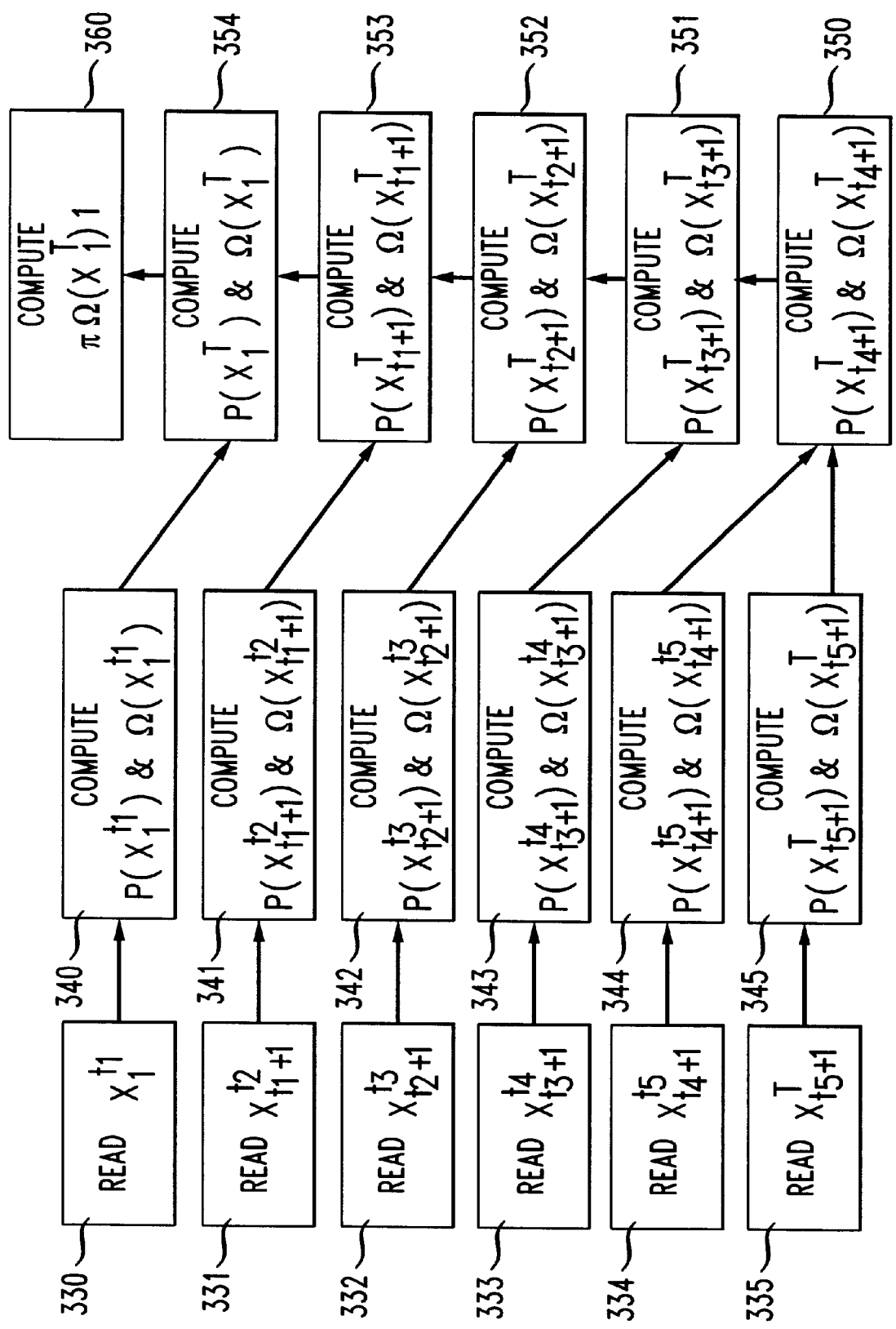
FIG. 5 is a flowchart of the steps performed by another embodiment of the present invention to calculate summations.

FIG. 5 is a flowchart of the steps performed by another embodiment of the present invention to perform step 14 of FIG. 1. First, the accumulators (i.e., locations in memory where the sums are accumulated) are initialized in a known manner. Initialization is typically achieved by clearing the memory.

In steps 330–335, the present invention reads training data from storage device 10 shown in FIG. 1. Training data is read sequentially, or in parallel to speed up processing.

In steps 340–345, P's and $\Omega$'s are calculated for training data read in steps 330–335 sequentially or in parallel. In steps 350–354, $\beta$'s and v's are calculate using input from steps 340–345 in a backward-only manner.

Equations (13) form a basis for the backward-only algorithm. Multiplying both sides of these equations from the right by 1 we replace matrices with column vectors:

$$\beta(x_{t_k}^T) = P(x_{t_k}^{t_{k+1}-1})\beta(x_{t_{k+1}}^T) \tag{19a}$$

$$v_{ij}(x_{t_k}^T) = P(x_{t_k}^{t_{k+1}-1})v_{ij}(x_{t_{k+1}}^T) + \Omega_{ij}(x_{t_k}^{t_{k+1}-1})\beta(x_{t_{k+1}}^T) \tag{19b}$$

where $$v_{ij}(x_{t_k}^T) = \Omega_{ij}(x_{t_k}^T)1$$

In particular, if $t_k = t$ and $t_{k+1} = t+1$ we have $$\beta(x_t^T) = P(x_t)\beta(x_{t+1}^T) \tag{20a}$$

$$v_{ij}(x_t^T) = P(x_t)v_{ij}(x_{t+1}^T) + W_{ij}(x_t)\beta(x_{t+1}^1) \tag{20b}$$

The sum in (9) can be written as $$S_{ijT} = \text{II}v_{ij}(x_1^T 0)$$

Since equations (20) compute $\beta(x_1^t)$ which is needed for reestimation of II, we do not need to compute $P(x_1^T)$ as in the forward-only alogrithm. Thus, backward-only algorithm (20) is simpler than the forward-only algorithm.

As previously described, it is important to perform scaling to improve the algorithm precision. The scaled version of the algorithm has the form:

$$\bar{\beta}(x_t^T) = c_t P(x_t)\bar{\beta}(x_{t+1}^T)$$

$$\bar{v}_{ij}(t,x) = c_t P(x_t)\bar{v}_{ij}(t+1,x) + c_t W_{ij}(x_t)\bar{\beta}(x_{t+1}^T)$$

$$c_t = 1/\beta(x_t^T) = 1/\text{II}P(x_t)\bar{\beta}(x_{t+1}^T)$$

This selection of the scale factors allows us to calculate the observation sequence likelihood as by-product of the Baum-Welch algorithm.

Specific Implementation for Discrete Distributions and Mixtures of Densities

In this section a detailed implementation of the present invention is given for the most widely used types of observation probability distributions: discrete distributions and mixtures of densities. In this case of discrete distributions, equation (1c) has the following solution:

$$b_{j,p+1}(x) = \sum_{t=1}^{T} V_j(t, x_1^T, \theta_p)\delta(x, x_t) \Big/ \sum_{t=1}^{T} V_j(t, x_1^T; \theta_p)$$

where $\delta(x,x_t)$ is the Kronecker delta function [$\delta(x,x_t)=1$ if $x=x_t$ and $\delta(x,x_t)=0$ otherwise]. Thus we can use forward-only or backward-only algorithms with $\eta_t = \delta(x,x_t)$.

The forward-only algorithm according to equations (18) takes the form $$\alpha(x_1^{t+1}) = \alpha(x_1^t)P(x_{t+1}) \tag{21a}$$

$$\omega_{ij}(t+1,x) = \omega_{ij}(t,x)P(x_{t+1}) + \alpha(x_1^t)\delta(x,x_{t+1})W_{ij}(x_{t+1}) \tag{21b}$$

$$P(x_1^{t+1}) = P(x_1^t)P(x_{t+1}) \tag{21c}$$

Equation (21b) can be rewritten in the following explicit form $$\omega_{ij,k}(t+1,x) = \sum_{m=1}^{n} \omega_{ij,m}(t,x)a_{mk}b_k(x_{t+1}) \text{ if } x \neq x_{t+1} \text{ or } k \neq j$$

and $$\omega_{ij,j}(t+1,x_{t+1}) = \sum_{m=1}^{n} \omega_{ij,m}(t,x_{t+1})a_{mk}b_k(x_{t+1}) + \alpha_i(x_1^t)a_{ij}b_j(x_{t+1}).$$

The initial conditions for the algorithm are $$\omega_{ij}(0,x) = 0, \alpha(x_1^0) = \pi_p.$$

Since $$U_{ij}(x_1^T) = \sum_x \omega_{ij}(T,x)1$$

equations (20) can be rewritten as $$\Pi_{i,p+1} = \Pi_{i,p}\beta_i(x_1^T)/\Pi_p\beta(x_1^T), \beta(x_1^T) = P(x_1^T)1 \tag{22a}$$

$$a_{ij,p+1} = \sum_x \omega_{ij}(T,x)1 \Big/ \sum_{j,x} \omega_{ij}(T,x)1 \tag{22b}$$

$$b_{j,p+1}(x) = \sum_i \omega_{ij}(T,x)1 \Big/ \sum_{i,x} \omega_{ij}(T,x)1. \tag{22c}$$

The scaled version of the algorithm takes the form $$\bar{\alpha}(x_1^{t+1}) = c_t\bar{\alpha}(x_1^t)P(x_{t+1}) \tag{23a}$$

$$\bar{\omega}_{ij}(t+1,x) = c_t\bar{\omega}_{ij}(t,x)P(x_{t+1}) + c_t\bar{\alpha}(x_1^t)\delta(x,x_{t+1})W_{ij}(x_{t+1}) \tag{23b}$$

$$\bar{P}(x_1^{t+1}) = c_t\bar{P}(x_1^t)P(x_{t+1}) \tag{23c}$$

The Markov chain stationary distribution can be estimated by $$\hat{\Pi}_j = \sum_{x,i} \omega_{ij}(x)1 \Big/ \sum_{x,i,j} \omega_{ij}(x)1$$

As pointed out before, the backward-only algorithm is simpler than the forward-only algorithm in the general case. According to equations (20), the backward-only algorithm can be described as follows:

Initialize $$\bar{\beta}(x_{T+1}^T)=1, \bar{\gamma}_{ij}(T+1,x)=0 \qquad (24a)$$

For t=T,T−1, . . . , 1 compute $$\bar{\beta}(x_t^T)=c_tP(x_t)\bar{\beta}(x_{t+1}^T) \qquad (24b)$$

$$\bar{\gamma}_{ij}(t,x)=c_tP(x_t)\bar{\gamma}_{ij}(t+1,x)+c_t\delta(x,x_t)W_{ij}(x_t)\bar{\beta}(x_{t+1}^T) \qquad (24c)$$

$$c_t=1/\beta(x_t^T)=1/\Pi_pP(x_t)\bar{\beta}(x_{t+1}^T)$$

Reestimate parameters:

$$\Pi_{i,p+1} = \Pi_{i,p}\bar{\beta}_i(x_1^T) \qquad (24d)$$

$$a_{ij,p+1} = \sum_x \Pi_{i,p}\bar{\gamma}_{ij}(1,x) \Big/ \sum_{j,x} \Pi_{i,p}\bar{\gamma}_{ij}(1,x) \qquad (24E)$$

$$B_{j,p+1}(x) = \sum_i \Pi_{i,p}\bar{\gamma}_{ij}(1,x) \Big/ \sum_{i,x} \Pi_{i,p}\bar{\gamma}_{ij}(1,x) \qquad (24f)$$

Repeat iterations over p till convergence.
In the case of mixture densities $$b_j(x;\psi_j) = \sum_{k=1}^{m_j} c_{jk}P_{jk}(x;\psi_{jk})$$

where x is the observation vector and $c_{jk}$ are mixture coefficients.
In this case the solution of equation (1c) has the form $$c_{jk,p+1} = c_{jk,p}\sum_{t=1}^{T}\gamma_t(j,k) \Big/ \sum_{t=1}^{T}V_j(t,x_1^T,\theta_p) \qquad (25a)$$

where $$\gamma_t(j,k) = V_j(t,x_1^T,\theta_p)p_{jk}(x_t;\psi_{jk,p})/b_j(x_t;\psi_{j,p}) \qquad (25b)$$

and $$\psi_{jk,p+1} = \mathrm{argmax}\sum_{t=1}^{T}\log p_{jk}(x_t;\psi_{jk})\gamma_t(j,k). \qquad (25c)$$

Thus, we need to calculate $\gamma_t(j,k)$ based on equation (25b). After substitutions we see that $$\sum_{t=1}^{T}\gamma_t(j,k) = \sum_{i=1}^{n}\sum_{t=1}^{T}B_{ij}(t,x_1^T;\theta)p_{jk}(x_t;\Psi_{jk})/b_j(x_t;\Psi_j). \qquad (26)$$

Thus, we need to calculate the sum in equation (8) with $\eta_t=p_{jk}(x_t;\Psi_{jk})/b_j(x_t;\Psi_j)$. Forward-only algorithm (18) takes the form $$\alpha(x_1^{t+1})=\alpha(x_1^t)P(x_{t+1}) \qquad (27a)$$

$$\omega_{ijk}(t+1)=\omega_{ijk}(t)P(x_{t+1})+\alpha(x_1^t)W_{ijk}(x_{t+1}) \qquad (27b)$$

$$P(x_1^{t+1})=P(x_1^t)P(x_{t+1}) \qquad (27c)$$

where $$W_{ij}(x_t)=a_{ij}p_{jk}(x_t;\Psi_{jk})\hat{e}_ie_j$$

is a matrix whose i,j-th element is $a_{ij}p_{jk}(x_t;\Psi_{jk})$.
The Model parameters are reestimated according to equations (1) and (25) which can be written as $$\Pi_{i,p+1} = \Pi_{i,p}\beta_i(x_1^T)/\Pi_p\beta(x_1^T), \quad \beta(x_1^T)=P(x_1^T)1 \qquad (28a)$$

$$a_{ij,p+1} = \sum_i c_{jk,p}\omega_{ijk}(T)1 \Big/ \sum_{i,k}c_{jk,p}\omega_{ijk}(T)1 \qquad (28b)$$

$$c_{jk,p+1} = c_{jk,p}\sum_i \omega_{ijk}(T)1 \Big/ \sum_{i,k}c_{jk,p}\omega_{ijk}(T)1. \qquad (28c)$$

The backward-only algorithm has a similar form. Also, the equations should be scaled to avoid numerical underflow as is in the case of discrete distributions considered previously.
For the Gaussian mixtures, we need to calculate $$\sum_t x_t\gamma_t(j,k) \text{ and } \sum_t x_t'x_t\gamma_t(j,k)$$

which can be written in the coordinate form:

$$g_{ijk} = \sum_{t=1}^{T}x_t^{(i)}\gamma_t(j,k)$$

$$h_{il,jk} = \sum_{t=1}^{T}x_t^{(i)}x_t^{(l)}\gamma_t(j,k)$$

where $x_t^{(i)}$ is i-th coordinate of $x_t$. These sums can also be evaluated using the forward-only or backward-only algorithm with $\eta_t=x_t^{(i)}p_{jk}(x_t;\Psi_{jk})/b_j(x_t;\Psi_j)$ for the first sum and $\eta_t=x_t^{(i)}x_t^{(l)}p_{jk}(x_t;\Psi_{jk})/b_j(x_t;\Psi_j)$ for the second sum.
The forward-only algorithm is given by the following equations $$\xi_{ijk}(t+1)=\xi_{ijk}(t)P(x_{t+1})+\alpha(x_1^t)W_{ijk}^\xi(x_{t+1}) \qquad (27d)$$

$$\xi_{il,jk}(t+1)=\xi_{il,jk}(t)P(x_{t+1})+\alpha(x_1^t)W_{il,jk}^\xi(x_{t+1}) \qquad (27e)$$

where $$W_{ijk}^\xi(x_t)=x_t^{(i)}p_{jk}(x_t;\Psi_{jk})A_je_j$$

$$W_{il,jk}^\xi(x_t)=x_t^{(i)}x_t^{(l)}p_{jk}(x_t;\Psi_{jk})A_je_j$$

$A_j$ is j-th column of matrix A. The reestimation equations can be written in the coordinate form as $$\mu_{jk,p+1}^{(i)} = \xi_{ijk}(T)1 \Big/ \sum_{q,r}c_{jk,p}\omega_{qjk}(T)1 \qquad (28d)$$

$$D_{jk,p+1}^{(il)} = \xi_{il,jk}(T)1 \Big/ \sum_{q}c_{jk,p}\omega_{qjk}(T)1 - \mu_{jk,p+1}^{(i)}\mu_{jk,p+1}^{(l)} \qquad (28e)$$

All these equations need to be scaled as previously described. Equations for the backward-only and parallel algorithm can be derived similarly.

Several embodiments of the present invention are specifically illustrated and/or described herein. However, it will be appreciated that modifications and variations of the present invention are covered by the above teachings and with in the purview of the appended claims without departing from the spirit and intended scope of the invention. For example, although the present invention is described in conjunction with a speech recognition training system, it also can be used in any other type of training system that uses HMMs, such as a handwriting recognition system. It can also be applied to modeling error sources in communication channels, in signal quantization and compression (e.g., speech or image signals, etc.).

What is claimed is:

1. In a method of performing speech recognition training using Hidden Markov Models comprising the steps of storing preprocessed speech signals that include a plurality of observations, assigning initial model parameters, performing model reestimation using the Baum-Welch algorithm, and storing the model parameters if they have converged, wherein the improvement comprises:

partitioning the stored speech signals into at least a first and second set of training data;

calculating a first summation using the first set of training data;

calculating a second summation using the second set of training data;

calculating a final summation using the first and second summations; and using said final summation in the model reestimation step, wherein the first summation and the second summation are calculated on parallel processors.

2. The method of claim 1 wherein the final summation is calculated recursively in parallel.

3. The method of claim 1 wherein the final summation is calculated recursively in a forward-only direction.

4. The method of claim 3 wherein the final summation is calculated recursively in a backward-only direction.

5. In a system for performing speech recognition training using Hidden Markov Models comprising means for storing preprocessed speech signals that include a plurality of observations, means for assigning initial model parameters, means for performing model reestimation using the Baum-Welch algorithm, and means for storing the model parameters if they have converged, wherein the improvement comprises:

means for partitioning the stored speech signals into at least a first and second set of training data;

means for calculating a first summation using the first set of training data, the means further comprising a first processor;

means for calculating a second summation using the second set of training data, the means further comprising a second processor;

means for calculating a final summation using the first and second summations; and means for providing the final summation to the means for performing model reestimation.

6. The system of claim 5 wherein the means for calculating a final summation uses a parallel recursion.

7. The system of claim 5 wherein the means for calculating a final summation uses a forward-only recursion.

8. The system of claim 5 wherein the means for calculating a final summation uses a backward-only recursion.

* * * * *